United States Patent
Underwood et al.

(10) Patent No.: US 11,720,678 B2
(45) Date of Patent: Aug. 8, 2023

(54) SYSTEMS AND METHODS FOR RANSOMWARE DETECTION AND MITIGATION

(71) Applicant: Cyber Crucible Inc., Severna Park, MD (US)

(72) Inventors: Dennis Underwood, Oakmont, PA (US); Kyle Nehman, Hillsboro, MD (US); Noah Greenberg, Venetia, PA (US); Mark Weideman, Gibsonia, PA (US)

(73) Assignee: Cyber Crucible, Pittsburgh, PA (US)

( * ) Notice: Subject to any disclaimer, the term of this patent is extended or adjusted under 35 U.S.C. 154(b) by 214 days.

(21) Appl. No.: 16/934,997

(22) Filed: Jul. 21, 2020

(65) Prior Publication Data
US 2021/0026961 A1 Jan. 28, 2021

Related U.S. Application Data

(60) Provisional application No. 62/877,748, filed on Jul. 23, 2019.

(51) Int. Cl.
*G06F 21/56* (2013.01)
*G06F 16/22* (2019.01)

(52) U.S. Cl.
CPC ........ *G06F 21/566* (2013.01); *G06F 16/2246* (2019.01); *G06F 2221/034* (2013.01)

(58) Field of Classification Search
CPC .............. G06F 21/566; G06F 16/2246; G06F 2221/034; G06F 16/9027; G06F 21/552
See application file for complete search history.

(56) References Cited

U.S. PATENT DOCUMENTS

| | | | |
|---|---|---|---|
| 8,769,685 B1* | 7/2014 | Conrad | G06F 21/562 726/25 |
| 10,609,066 B1* | 3/2020 | Nossik | H04L 63/1408 |
| 10,810,304 B2* | 10/2020 | Gupta | G06F 8/70 |
| 11,093,625 B2* | 8/2021 | Vijayvargiya | G06F 21/552 |
| 2007/0136341 A1 | 6/2007 | Schopp | |
| 2008/0052300 A1 | 2/2008 | Horgan | |
| 2008/0133531 A1* | 6/2008 | Baskerville | G06F 21/6254 707/999.009 |

(Continued)

OTHER PUBLICATIONS

International Search Report dated Oct. 6, 2020, 12 pages.

(Continued)

*Primary Examiner* — Christopher A Revak
(74) *Attorney, Agent, or Firm* — Vector IP Law Group; Robert S. Babayi

(57) ABSTRACT

System and method for protecting a computing device of a target system against ransomware attacks employs a file system having a data structure used by an operating system of the computing device for managing files. A software or a hardware installed agent in the computing device performs one or more actions autonomously on behalf of the target system. The agent autonomously creates one or more trap files in the data structure of the filing system. A trap file is a file access to which indicates a probability of ransomware attack. The agent monitors access to the one or more trap files. Upon detecting access to a trap file, remedial action is performed by the target system against the probability of ransomware attack.

20 Claims, 11 Drawing Sheets

(56) References Cited

U.S. PATENT DOCUMENTS

| | | | |
|---|---|---|---|
| 2011/0208849 A1 | 8/2011 | Barnett et al. | |
| 2012/0079596 A1 | 3/2012 | Thomas et al. | |
| 2013/0276114 A1* | 10/2013 | Friedrichs | G06F 21/56 |
| | | | 726/23 |
| 2016/0127395 A1 | 5/2016 | Underwood et al. | |
| 2017/0366563 A1* | 12/2017 | Volfman | H04L 63/1416 |
| 2018/0075239 A1 | 3/2018 | Boutnaru | |
| 2018/0189490 A1 | 7/2018 | Maciejak et al. | |
| 2018/0293379 A1 | 10/2018 | Dahan | |
| 2019/0108340 A1 | 4/2019 | Bedhapudi et al. | |
| 2021/0279332 A1* | 9/2021 | Goldshmidt | H04L 63/1491 |

OTHER PUBLICATIONS

Gomez-Hernandez, et al., "R-Locker: Thwarting Ransomware Action through a Honeyfile-based Approach." See discussions, stats, and author profiles for this publication at: https://www.researchgate.net/publication/339983083, pp. 1-21.

Wang, et al., "Demadroid: Object Reference Graph-Based Malware Detection in Android." In: Security and Communication Networks vol. 2018, Article ID 7064131, https://doi.org/10.1155/2018/7064131, pp. 1-17.

Akbanov, et al. "Ransomware Detection and Mitigation Using Software-Defined Networking: The Case of WannaCry." Article in Computers & Electrical Engineering, Jun. 2019, pp. 1-19.

* cited by examiner

SYSTEMS AND METHODS FOR RANSOMWARE DETECTION AND MITIGATION

BACKGROUND

Technical Field

The present disclosure relates generally to cybersecurity technology. More specifically, the present disclosure relates to systems and methods for ransomware detection and mitigation.

Related Art

In the cybersecurity field, ransomware is malware which denies a victim access to data or equipment until an attacker allows access to be returned. Typically, access is denied due to the attacker encrypting the victim's data, and decryption capability is provided after the victim pays the ransom. Defensive and attacker ransomware-focused capabilities have matured in capability and complexity of encryption capability, scope of resources denied, and payment methodologies.

Regarding encryption capability, encryption algorithms have grown in quality to the standardized encryption algorithms and implementations seen in use today for regulated and secure government, military, and commercial uses. The quality of an encryption algorithm is assessed based on the inability of a party with modern computing hardware, that is not the intended or approved decryptor, to decrypt. Current strong encryption that is certified by the National Institute of Standards and Technology ("NIST"), 256-bit AES encryption, is estimated to take $9.63 \times 10^{52}$ years for an unintended party to decrypt.

Encryption algorithm vulnerabilities affect encrypted material's (ciphertext's) robustness against being exposed by unintended parties. These vulnerabilities can be categorized by vulnerabilities in the logic of the encryption itself, and vulnerabilities introduced by improvements in computing power. Often, each category influences the other. Discovered logic fallacies which may have reduced naive decryption to still-longer-than-lifetimes (for example) timeframes, over time become threats resulting in decryption in much shorter times due to improvements in computing power.

For ransomware implications, some ransomware malware leverages encryption algorithms which are vulnerable to cryptographic attacks. This is one method that allows security researchers to have some initial success against ransomware, without paying the attacker a ransom. While ransomware which is vulnerable may still be in use, the attackers' financial motivation to force the victims to not bypass their ransom payment has changed this dynamic. Modern ransomware malware increasingly leverages encryption algorithms that are robust to decrypt post-encryption, without a decryption program provided by the attacker.

During encryption operations, cryptovariables are settings and variables required to encrypt and decrypt material. These variables go beyond encryption algorithm or encryption key. They include such elements as encryption key size, padding algorithm, nonce, initialization vector (iv), or encryption algorithm variant. Creation, distribution, and implementation of these cryptovariables are necessary for any encryption operations, of which ransomware is certainly an encryption-based operation.

The encryption operations must be planned, and conducted, in a manner which does not introduce vulnerabilities which allow unintended recipients to decrypt. For ransomware authors, this means that encryption operations, improperly conducted, may result in opportunities for advanced cybersecurity defenders to exploit those vulnerabilities to decrypt without paying the ransom, even if the encryption algorithm used is strong.

Historically, ransomware authors have created and distributed cryptovariables in ways which have enabled cybersecurity defenders to gain access. This included predictable cryptovariables, such as encryption keys that are not created via proper randomization (an encryption key of all zeroes, for example), improper cryptovariable reuse, and improper implementation of encryption algorithms.

Modern ransomware demonstrates an increase in knowledge on cryptographic operations. Cryptovariables are random, uniquely generated, securely distributed, and securely stored and implemented. Easy wins from previous operational vulnerabilities may still exist in some infections, but ransomware attackers, financially incentivized to force payment of their ransom, have corrected most or all operational vulnerabilities.

Regarding ransomware scope of operations, the more data and devices which are rendered unavailable to the victim, the greater the financial value of the attack to the ransomware attacker. Additionally, automated spreading of ransomware malware from device to device may result in additional connected victims not related to the original target. Examples of this may be customers or contractors traversing a business network, or supply chain companies connected to the attacker's original target.

This has also extended to increases in capability of the malware, to include network resources which the victim is connected to. This means that items such as file servers which the victim is connected to are also able to be encrypted, sometimes automatically.

Ransomware attackers have begun combining tactics normally reserved for data breaches with ransomware attacks. This is related to both maximizing the cost, and subsequent ransom value, to the victim. This is done in two ways: removing backups, and targeting high value data. Attackers now leverage automated and manual discovery of victim backups, to ensure the backups are not available to the victim through either encryption or deletion. This may also involve ensuring they have access through introduction of other attack activities, such as elevation of privileges to ensure administrator defenses do not protect backups.

Additionally, while working inside of the victim's network, versus executing ransomware immediately, attackers are also ensuring they first gain access to the highest value data to the business or individual. Maximum cost to the client is related to the intellectual property and operations data found on servers not necessarily immediately available to the attacker, without maneuvering in the network to the appropriate machines and permissions.

Ransomware uses multiple file access and traversal algorithms to ensure the most valuable user and corporate data is encrypted. The file access algorithms for ransomware consist of a combination of tree traversal algorithms such as the binary search tree algorithm, and executing these tree traversal algorithms in a manner which has a higher probability of encrypting the most data without being detected and stopped.

The ransomware program search for data, and subsequent encryption of data, typically must be automated. This is because, for one example, the attacker must be able to execute their encryption attack across many machines and many victims too quickly for a person to manually manage. Therefore, the attacker must pre-set algorithms based on the probability of victims having large quantities of valuable data. These algorithms are predictable and finite in number.

Encrypting the most data, and the most valuable data, means that the order of encryption operations biases locations in the network that are mostly likely to have valuable data. For example, a ransomware program may be configured to encrypt network servers which have shared folders with a user, because that server most likely has files more important to the business than what an individual would have on their desktop, but also would contain the sum of files being saved across all business workstations.

Encrypting without being detected and subsequently stopped by a victim means performing actions such as prioritizing encrypting files which would be not noticed by a user or administrator for as long as possible, while first encrypting files valuable to the victim. For example, encrypting the user's files on the desktop would almost certainly have less files than a server, meaning less potential value to the victim, and the encryption operation would be immediately noticed by the user. Another example would be encrypting files which are necessary for proper operation of servers or desktops. If the user's desktop crashes due to operating system files being encrypted, not only would the ransomware not be able to continue operating due to the crashed system, but it would also immediately be noticed by the victim, whom would immediately take measures to try to stop further encryption.

As such, it is desirable to provide users with capabilities to detect and mitigate ransomware attacks. Accordingly, the systems and methods disclosed herein solve these and other needs.

SUMMARY

Briefly, according to the present invention, a system and method for protecting a computing device of a target system against ransomware attacks employs a file system having a data structure used by an operating system of the computing device for managing files. A software or a hardware installed agent in the computing device performs one or more actions autonomously on behalf of the target system. The agent autonomously creates one or more trap files in the data structure of the filing system. A trap file is a file access to which indicates a probability of ransomware attack. The agent monitors access to the one or more trap files. Upon detecting access to a trap file, remedial action is performed by the target system against the probability of ransomware attack.

According to other features of the present invention, the data structure of the file system is a tree structure and a file path for a trap file is specified at the highest point of the tree structure. File paths to trap files can be specified using a search tree algorithm such as binary search tree algorithm or tree traversal algorithm. The tree traversal algorithm can be one of depth-first traversal, breadth-first traversal, Monte Carlo tree search, or random sampling algorithms. The depth-first traversal algorithm can be one of Pre-Order, In-Order, Reverse In-Order, or Post-order algorithms.

According to other details of the present invention, the remedial action includes notifying a user of the target system or automatically uploading an accessed trap file. The remedial action can also include identifying a process that accesses the one or more trap files such that the identified process is either isolated, killed, or suspended.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present invention relates to systems and methods for ransomware detection and protection, as described in detail below in connection with FIGS. 1-11.

A part of the ransomware behavior detection strategy is the use of monitored artifacts placed on the system. One such artifact is a trap file positioned within a filing system used by an operating system of a computing device, including a processing node or machine, a client, a server or a stand-alone workstation. Access to a trap file indicates a probability of a ransomware attack. These artifacts are placed by position, content, and quality to enable a very high probability of both detection of ransomware activity and behavior of the ransomware activity, and a very low probability of users encountering the artifacts.

In one embodiment, the present invention relates to systems and methods for automatically discovering the start of a ransomware attack based on access to trap files and defeating an attacker's encryption. In another embodiment, the present invention provides both hardware and software solutions, because attackers may gain the ability to render an attacked computing device unable to submit files to decrypt, or prohibit the user from manually interacting with the infected system.

In other embodiments, the present invention uses a combination of targeted data collected from a user's computing devices, using cryptanalytic techniques, right before the attack occurs and during the attack, combined with cryptographic analytics using machine learning techniques on the collected data, provide targets of ransomware attacks the ability to both automatically discovery and recover from ransomware attacks. The system of the present invention uses an agent installed on a machine, and a remote server that performs cryptographically-aligned analytics. The agent can have software-based or a hardware-based monitoring capability. In one embodiment, an agent is a software computer program or a hardware that performs various actions autonomously on behalf of targets of ransomware attacks.

Figure 1:
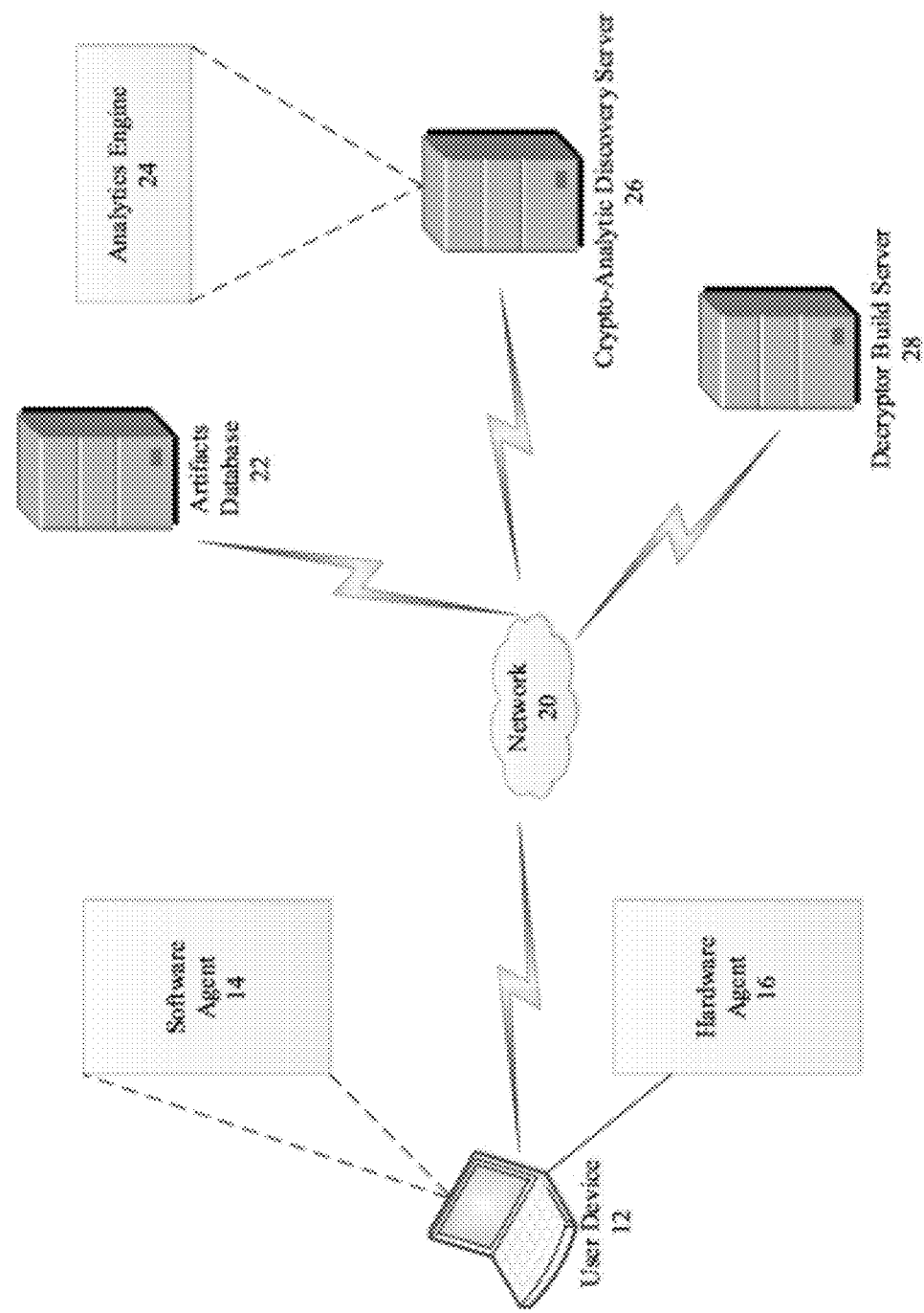
FIG. 1 is a diagram illustrating the system of the present disclosure.

FIG. 1 is a diagram illustrating the system of the present disclosure, indicated generally at 10. The system 10 includes a user device 12, a network 20, an artifacts database 22, a crypto-analytic discovery server 26, and a decryptor build server 28. The user device 12 can be any electronic device such as a personal computer, a desktop computer, a tablet computer, mobile phone, a smartphone, a phablet, an embedded device, a wearable device, a field-programmable gate array ("FPGA"), an application-specific integrated circuit ("ASIC"), etc. The user device 12 can include a software agent 14 and/or a hardware agent 16. The user device 12 can further connect to an agent web application or an agent API, which will be discussed in further detail below.

The artifacts database 22 can receive artifacts from the user device 12. In one embodiment, the artifacts include data and/or telemetry generated by ransomware that is present on the user device 12. The crypto-analytic discovery server 26 can include one or more servers that query the artifacts database 22 with analytics focused on ransomware behavior, and can execute an analytics engine 24, which performs cryptographically-aligned analytics. The decryptor build server 28 can generate decryptor solutions for combating ransomware software. These will be discussed in further detail below. It is noted that the artifacts database 22, the crypto-analytic discovery server 26, and the decryptor build server 28 can be embodied in a single hardware unit, or in multiple hardware units.

The user device 12, the artifacts database 22, the crypto-analytic discovery server 26, and the decryptor build server 28 can be connected to the network 20 such that each can transmit and receive data from each other. The network 20 can be any type of wired or wireless network, including but not limited to, a legacy radio access network ("RAN"), a Long Term Evolution radio access network ("LTE-RAN"), a wireless local area network ("WLAN"), such as a WiFi network, an Ethernet connection, or any other type network used to support communication. For example, the user device 12 can be connected to the artifacts database 22 via a wireless network connection (e.g., Bluetooth, WiFi, LTE-RAN, etc.). The crypto-analytic discovery server 26 can be any type of server/database/hardware component used for executing the analytics engine 24. Alternatively, the analytics engine 24 could be on the cloud.

An agent, which is embodied as software (e.g., the software agent 14) or hardware (e.g., the hardware agent 16), collects data focused on activities on the user device 12, whether it is a desktop/laptop, a server, an IoT/embedded device, a mobile device, a computing device etc. The user device in one embodiment of the invention is a computing device that executes an operating system that uses a filing system implemented in a hard drive or directory. A directory contains a list of file names and other information related to the files, including file paths. The agent can exist as either a software application, or as a hardware-based monitoring capability.

Figure 2:
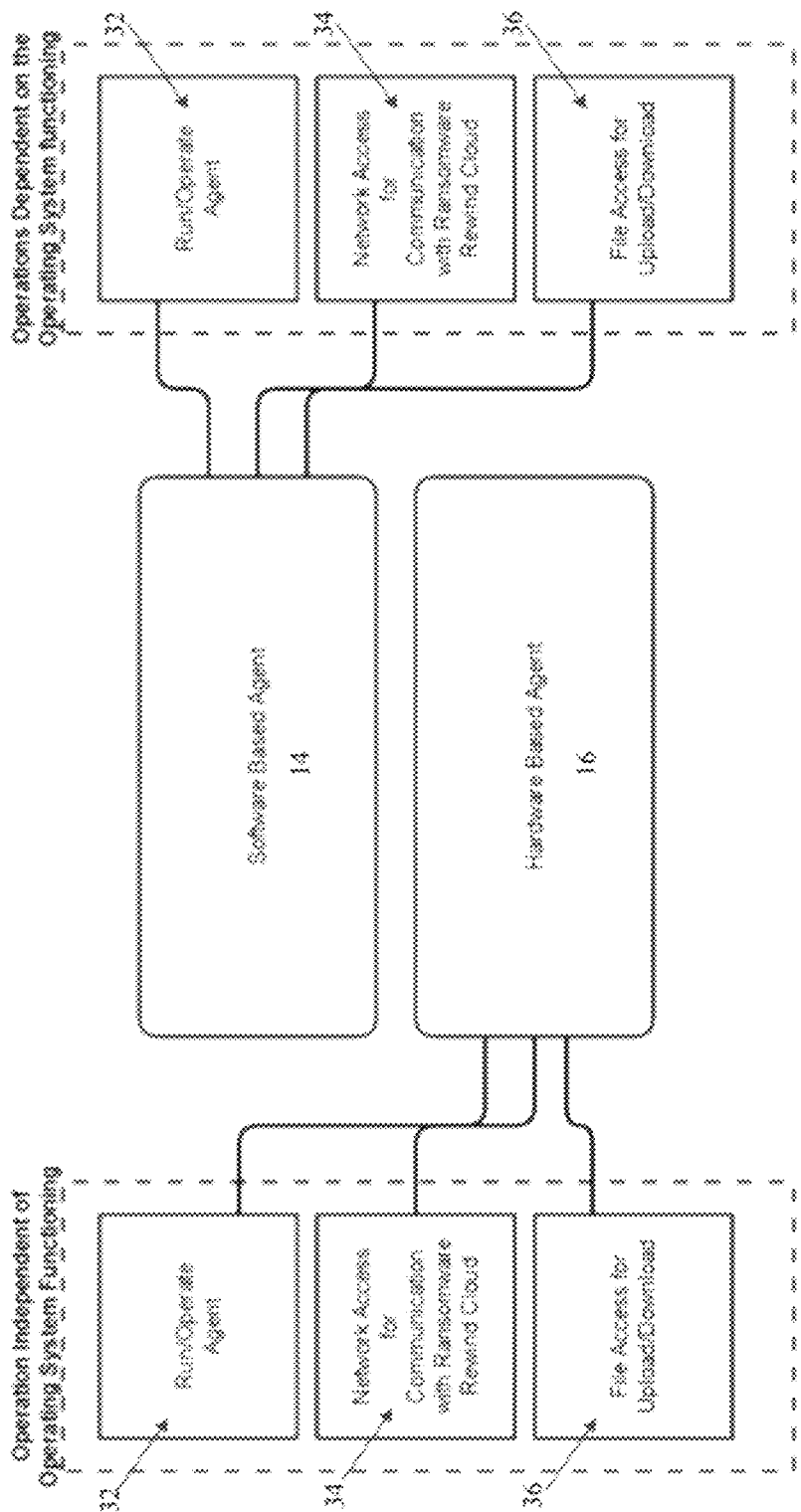
FIG. 2 is a diagram illustrating possible operations of the software agent and the hardware agent of the present disclosure.

FIG. 2 is a diagram showing operations of the software agent 14 and the hardware agent 16. Specifically, the software agent 14 and the hardware agent 16 can perform operations including executing/operating the agent 32, accessing databases/servers 34 (e.g., the artifacts database 22, the crypto-analytic discovery server 26, the decryptor build server 28, and the cloud), and accessing files for upload/download 36.

Figure 3:
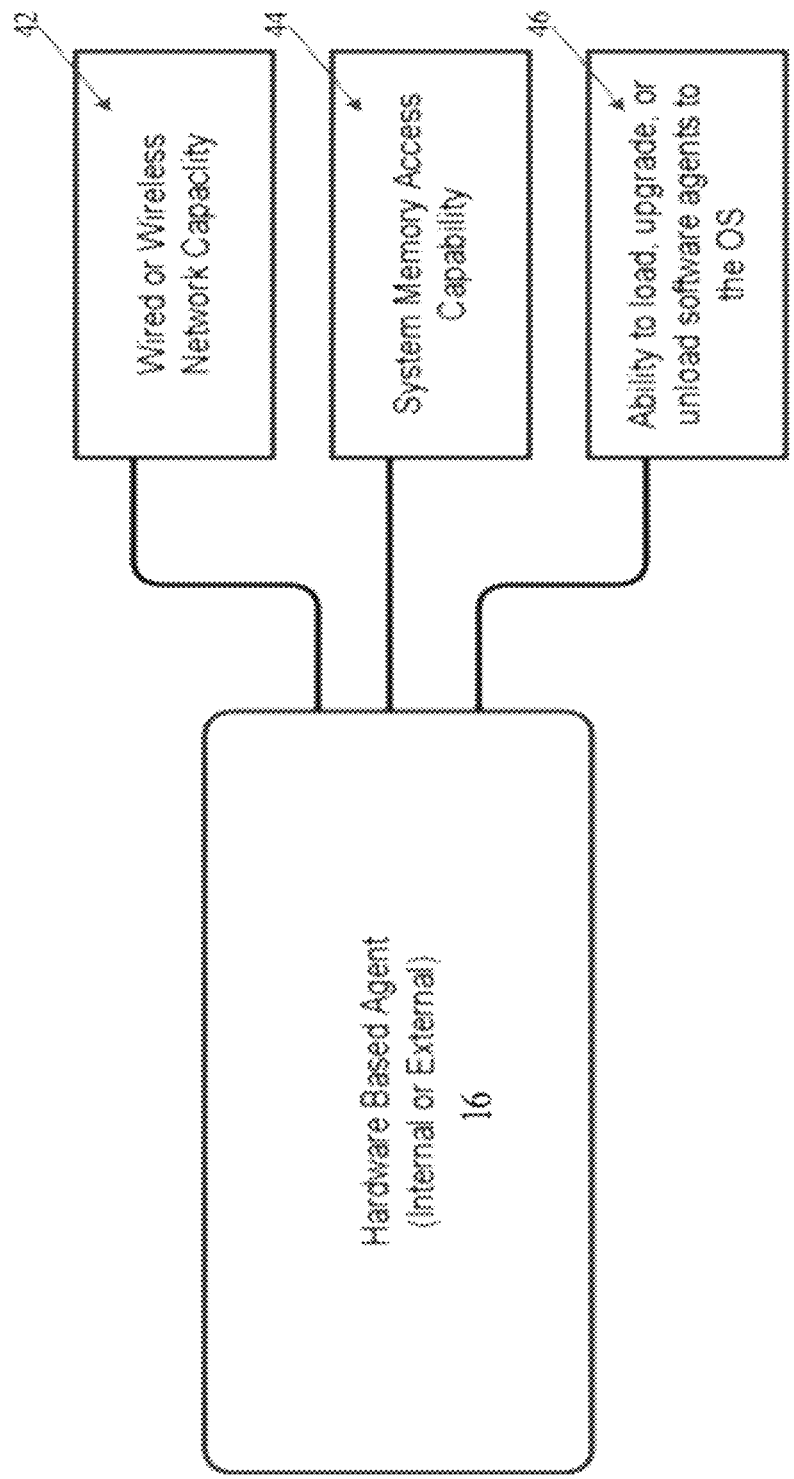
FIG. 3 is a diagram illustrating components of the hardware agent of the present disclosure.

FIG. 3 is a diagram showing components of the hardware agent 16, which can be installed in and/or attached to the user device 12 internally or externally. Specifically, FIG. 3 shows a wired or wireless network capability component 42, a system memory access capability component 44, and an upload/upgrade component 46.

Figure 4:
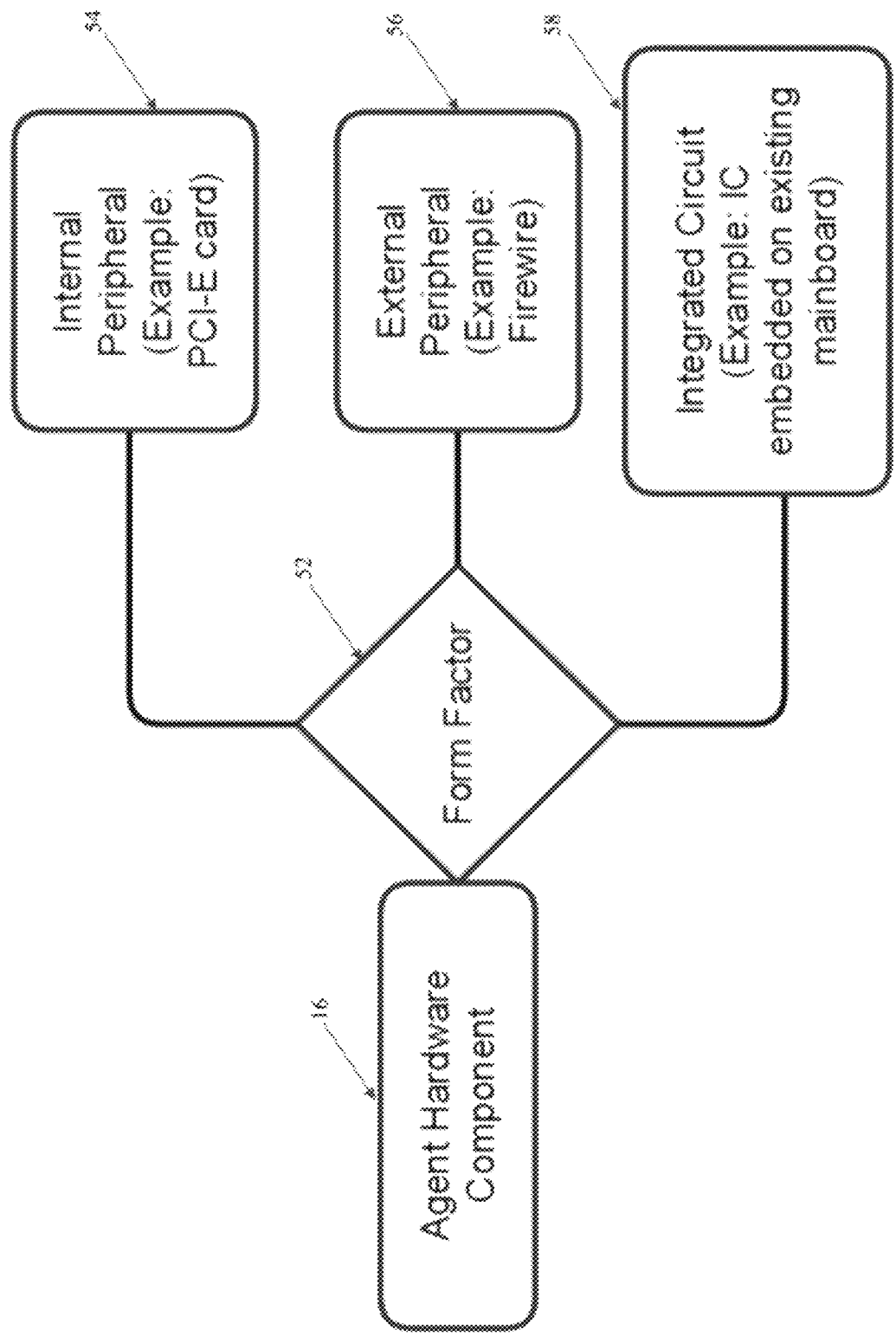
FIG. 4 is a diagram illustrating example connection options of the hardware agent of the present disclosure to the user device.

FIG. 4 is a diagram showing example connection options of the hardware agent 16 to the user device 12 (not shown). Specifically, the hardware component 16 (having a form factor 52) can be connected to the user device 12 via an internal peripheral 54 (e.g., a PCI-E card), an external peripheral (e.g., Firewire) 56, or an integrated circuit 58 (e.g., an integrated circuit embedded on an existing mainboard). Those skilled in the art would understand that other connection options can be used.

An agent installed in the user device 12 monitors file access activity for detecting ransomware attacks and performs analytics to determine whether to submit data to the artifacts database 22, with a strong bias towards submitting data which has an unknown likelihood of being involved in a ransomware activity, versus only submitting data which has a high likelihood. The rationale is that, once a ransomware attack has occurred on the monitored device, the artifacts necessary for both attack discovery, and decryption algorithm discovery must already be collected to be useful.

In one embodiment, the agent monitors user device 12 memory and files for forensic evidence of potential crypto-variables in real time, to submit to the remote artifacts database 22. This includes cryptovariables that can be encryption keys, decryption keys, initialization vectors, or other pieces of data associated with cryptographic operations on the user device 12. The agent further monitors the user device 12 operating system for use of operating system cryptographic API calls. Specifically, the agent monitors encryption-associated functions and methods, and information generated from their use is transmitted to the artifacts database 22. The agent also monitors file access events, including access to trap files, to include analytics such as one program writing multiple files, or repeated access of programs to rename files. The order of which programs access files for reading and writing is important, and is preserved as well while the data is sent to the artifacts database 22.

Figure 5:
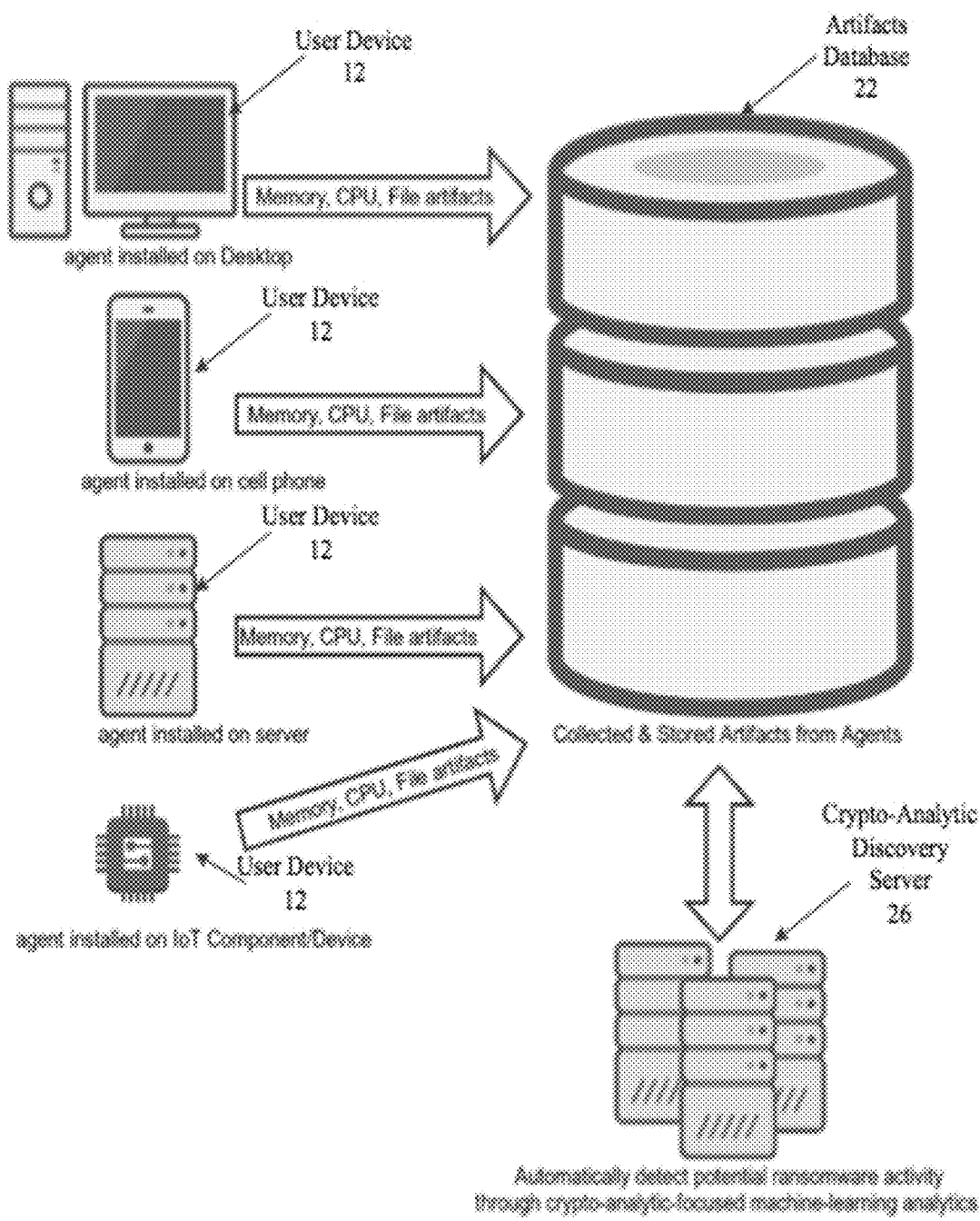
FIG. 5 is a diagram illustrating an example of multiple user devices transmitting data to the artifacts database of the present disclosure.

FIG. 5 is a diagram showing an example of multiple user devices (e.g., a desktop, a mobile device, a server, and a IoT device) transmitting data to the artifacts database 22, which communicates with the crypto-analytic discovery server 26. It is noted that ransomware attackers can attack defensive products which interfere with their attack, and attackers will gain privileged access to user devices to render the system itself unable to operate. This means a software solution may not properly enable automated detection, submission of, and decryption of ransomware encryption and ransomware encrypted files.

There are also some analytics and monitoring of potential forensic artifacts that cannot be performed strictly from hardware. Due to this, the system 10 can be a hardware-only version (only uses the hardware agent 16), and a hybrid hardware-software version (uses both the software agent 14 and the hardware agent 16). The hardware agent 16 can: 1)

operate independently of the operating system, and function regardless of whether the operating system files are encrypted; 2) have visibility to system memory and CPU operations; 3) can exist as an on-board programmable chip, an internal peripheral (like a PCI-E card), or external peripheral; 4) can conduct wired or wireless network communication; 5) can submit artifacts to the artifact database 22; 6) can submit potentially encrypted files for to the analytics engine 24 for analysis; 7) can receive and execute decryption solutions; and 8) can receive and execute/load the software agent 14.

The agent (via the software agent 14, the hardware agent 16, or both) continuously submits potentially useful information to the remote artifacts database 22. The crypto-analytic discovery server 26 continually query the artifacts database 22 with analytics focused on ransomware software behaviors which would exhibit on the machine.

Figure 6:
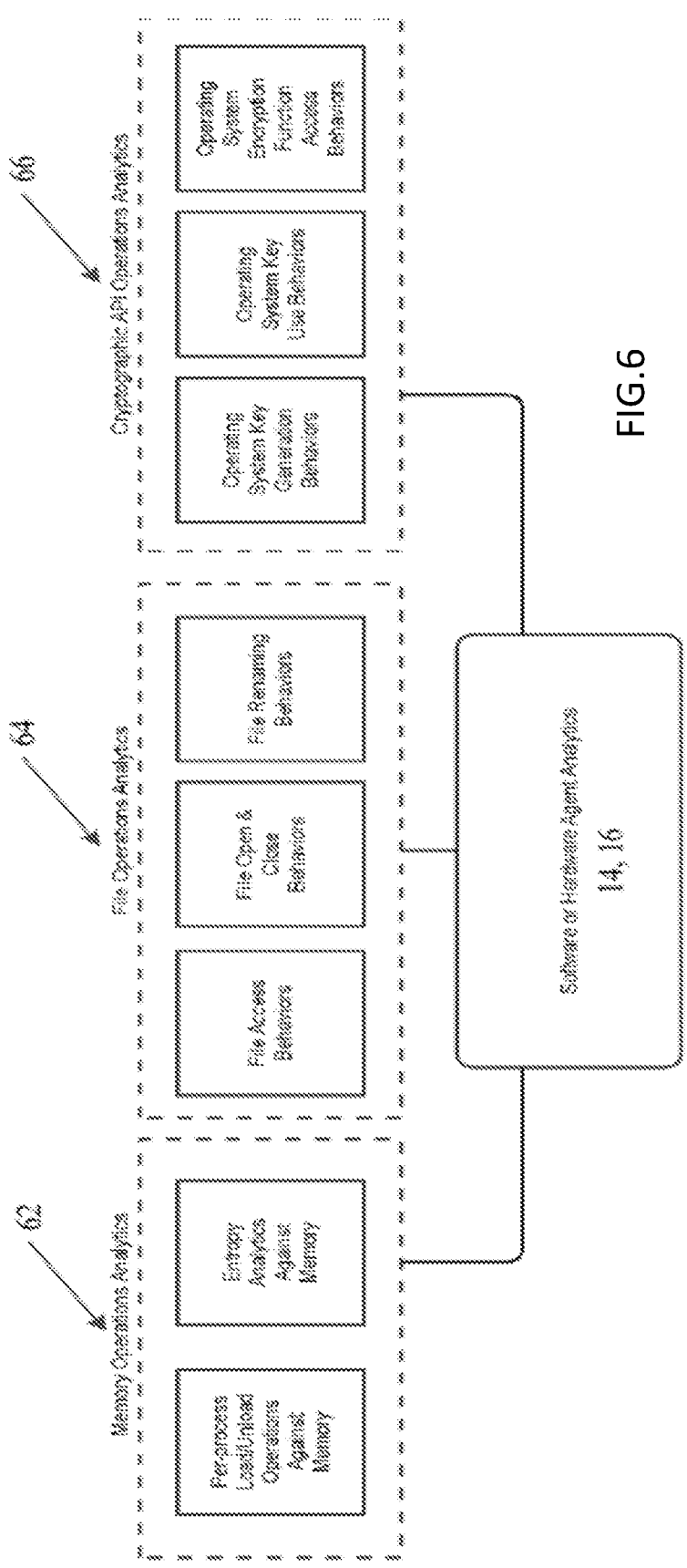
FIG. 6 is a diagram illustrating example analytics performed by the agent of the present disclosure.

FIG. 6 is a diagram showing example analytics performed by the agent. Specifically, the analytics can include memory operations analytics 62, file operations analytics 64, and cryptographic API operations analytics 66. The memory operations analytics 62 includes pre-processing load/unload operations against memory and entropy analytics against memory. The file operations analytics 64 includes file access behaviors, file open and close behaviors, and file renaming behaviors, including those applied to trap files. The cryptographic API operations analytics 66 includes operating system key generation behaviors, operating system key use behaviors, and operating system encryption function behaviors. These will be discussed in further detail throughout this disclosure.

During a suspected ransomware attack discovery, the system 10 can perform a discovery process. For example, the discovery process can include the system 10 determining that, for example: 1) a program adds an ".encrypted" extension to several files in a directory in rapid succession; 2) a program generates a large number of cryptovariables in a short period of time, observed in memory; and/or 3) a program accesses a cryptography-focused operating system function many times in a short period of time, with a large number of file read and writes in short time.

Additionally, the system 10 can apply machine learning analytics to: 1) apply statistical probabilities to filename changes expected for legitimate operations; 2) conduct entropy calculations concerning file system changes as observed in the artifacts database 22; and/or 3) apply statistical probabilities as to programs observed generating cryptographic materials or using cryptographic operations.

Upon successful application of machine learning or other analytics which identify a potential ransomware attack, the system 10 can perform a remedial action. In a first example, the remedial action can include notifying the user to manually submit either a chosen pre-positioned file, including a trap file, created by the agent or a client encrypted file to the encrypted file server through the agent web application or the agent API. In a second example, the remedial action can include the agent automatically uploading either a chosen pre-positioned file such as a trap file, or a client encrypted file, including a trap file, to an encrypted file server, and register the upload with the agent web application or the agent API.

Upon submission receipt, the system 10, via the analytics engine 24, can perform combinations of cryptovariables, cryptographic operations, and file configurations in a manner which increases the likelihood of success, with the goal of identifying a correctly decrypted file as efficiently as possible. A variety of analytic servers can operate in a parallel distributed processing model to conduct cryptographic analysis of inputs from the encrypted file, combined with artifacts of suspected cryptographic activity, and outputs are examined to determine the correct cryptographic variables to implement.

For example, a ransomware variant can randomly generate an AES 256 byte encryption key to encrypt all files on the system, using the "AES CTR" efficient file encryption variant of the AES encryption algorithm, and implements PKCS7 padding. Leveraging these, and a variety of other cryptovariables, the artifacts database 22 contains all possible keys or partial key material observed from memory or having been used in likely cryptographic activities on a system. Starting with the most recently generated keys, the analytics engine 24 examines the specific submitted file's position in the AES CTR counter value cryptovariable, and determines the most likely counter cryptovariable to apply with the probable collected encryption keys. While attempting the decryption using these variables, starting with the variables the machine learning algorithm has determined have the highest probability of success, the system 10 can find a successful combination of cryptovariables through examining outputs of the decrypted file.

The discovery of a successful combination of cryptovariables is registered with the agent web application and or the agent API. Other decryption-focused crypto-analytic servers are notified of this, and stop examining this particular file, which can be a trap file. Additionally, the system 10 can task the decryptor build server 28 with generating a decryptor solution for the user. Once the system 10 has found a combination of cryptovariables which result in the successful decryption of a client-submitted encrypted file, including an encrypted trap file, and generates the decryptor solution, the system 10 can automatically deploy the decryptor solution to be executed on the user device 12.

The decryptor solution can be executed as separate stand-alone software, as a dynamically loaded software module via the software agent 14 or the hardware agent 16. The decryptor build server 28 can listen for tasks to build decryptor solutions, which can be custom made with the correct cryptographic variables inserted, in addition to variables such as the order in which files must be decrypted and renamed to their original names.

Once the decryptor build server 28 generates the decryptor solution, it then uploads to a file server, and registers the decryptor solution with the agent web application and/or the agent API. From there, per user configuration via the agent web application/agent API, the user can be notified that there is a decryption capability (e.g., the decryptor solution) available to them, for download to the machine specified in the agent web application/agent API. The user then can download the decryptor solution. Once the user is notified that there is a decryption solution available to them, that it has automatically been deployed to the user device 12, and that it is currently decrypting, a status of the decryptor solution is available via the agent web application/agent API for remote monitoring by the user.

Figure 7:
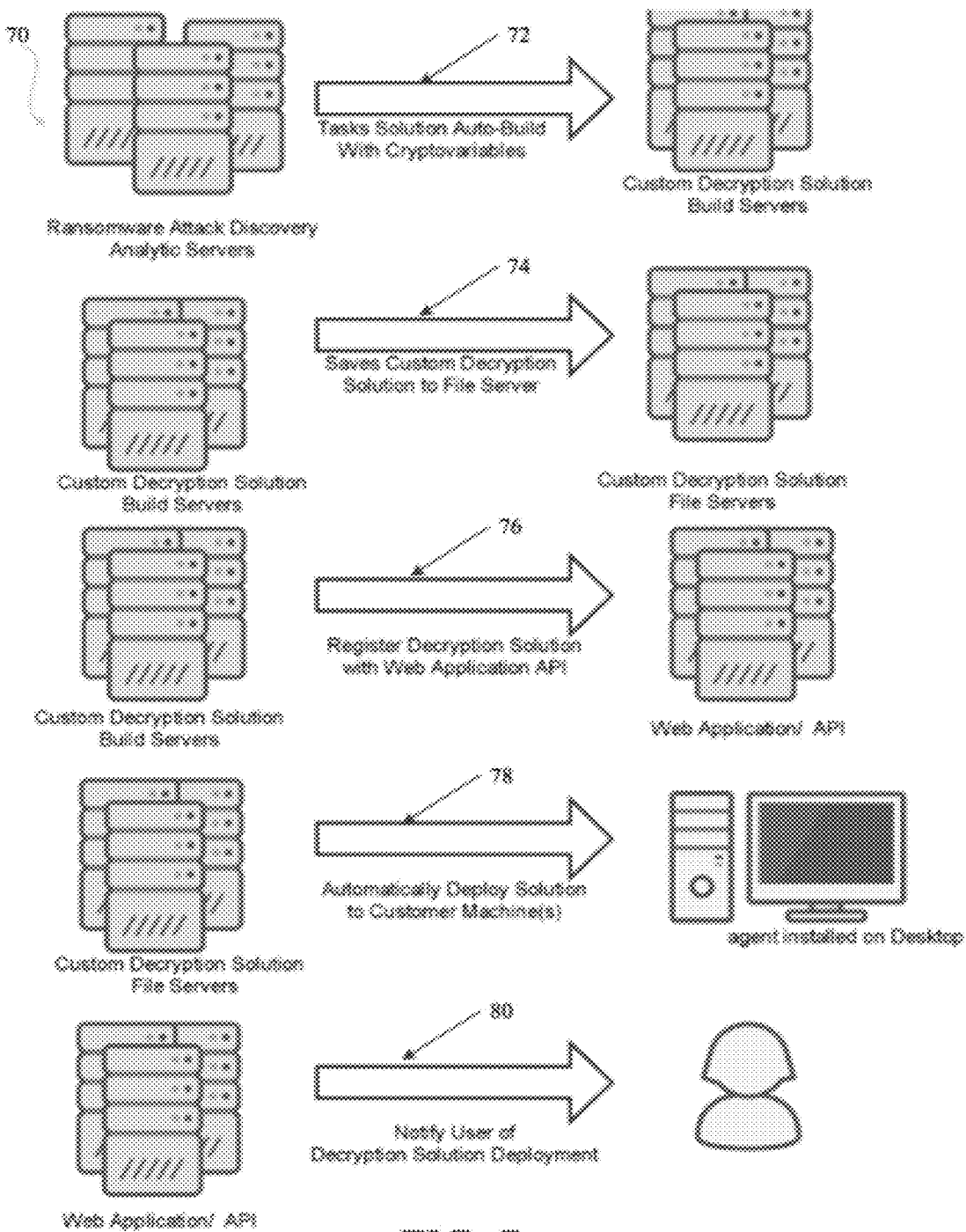
FIG. 7 is a diagram illustrating steps for detecting a ransomware attack and generating/deploying the decryptor solution.

FIG. 7 is a diagram showing steps discussed above for detecting a ransomware attack, and generating/deploying the decryptor solution, indicated generally at 70. In step 72, the system 10 tasks the decryptor build server 28 to generate the decryptor solution. In step 74, the system 10 saves/uploads the decryptor solution to a file server. In step 76, the system 10 registers the decryptor solution with the agent web application and/or the agent API. In step 78, the system 10 deploys the decryptor solution to the user device 12. In step 80, the system 10 notifies the user of the decryptor solution's deployment.

Figure 8:
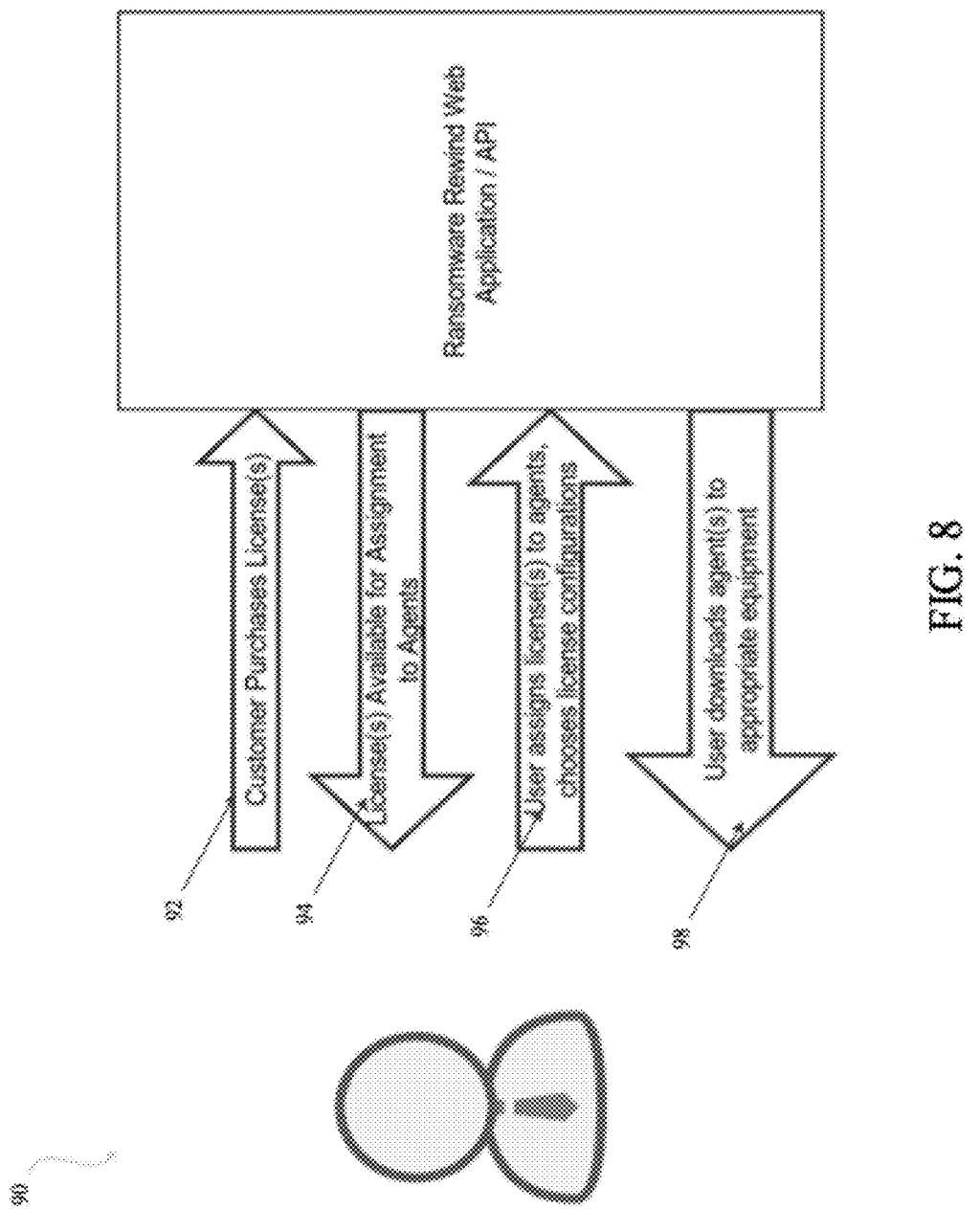
FIG. 8 is a diagram illustrating steps for obtaining a user license to the agent of the present disclosure.

FIG. 8 is a diagram showing steps for obtaining a user license to the agent, indicated generally at 90. In step 92, the user purchases a license(s) for using the agent. In step 94, the user receives a list of licenses available for assignment to agents. In step 96, the user assigns one or more licenses to one or more agents, and selects license configurations. In step 98, the user downloads agents to the user device(s). As used herein, an agent is a software program or hardware that performs various actions continuously and autonomously on behalf of a user or an organization. For example, an agent may position various trap files in locations within a filing system used by an operating system in a node or machine. The file system has a data structure used by the operating system of the computing devices for managing files. The agent monitors access to the trap files before performing remedial action in case of a ransomware attack. A trap file is a file access which indicates a probability of ransomware attack.

Figure 9:
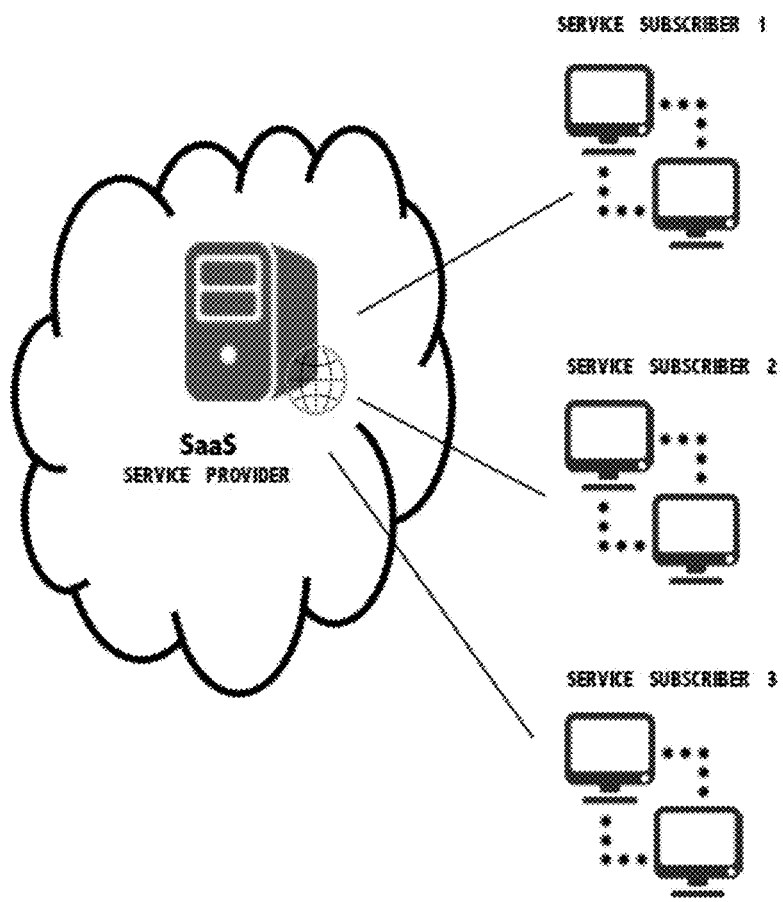
FIG. 9 depicts a block diagram of a system implementing a Software-as-a-Service (SaaS) platform with servers.

FIG. 9 depicts a block diagram of a system implementing a Software-as-a-Service (SaaS) platform with servers including the crypto-analytic discovery server 26 and decryptor build server 28 shown in FIG. 1. The system executes a software system called Ransomware Rewind, which is developed and implemented by Cyber Crucible Inc., the assignee of the present application, to protect against ransom malware by detecting ransomware activity. Once installed, Ransomware Rewind software can be executed as an agent in any node of the system, including a server, a client, a user device, or workstation. Once executed, a Ransomware Rewind agent creates trap files within the file system of the node. A file system is the methods and data structures that an operating system uses to keep track of files on a disk or partition; that is, the way the files are organized on the disk. The trap files are created in order to detect a potential ransomware attack. Access to a trap file indicates ransomware attack. The Ransomware Rewind agent monitors access to trap file access and performs remedial action against ransomware attack based on cryptographically-aligned analytics according to the present invention.

In one embodiment of the SaaS, Ransomware Rewind software system is implemented using Amazon Web Services, where communications occur via Amazon messaging services (SNS/SQS) or HTTPS REST APIs. The SaaS also implements licensing and agent delivery services to subscribers 1, 2 and 3 on a subscription basis and is hosted centrally or distributed.

Typically, the network over which the present invention is implemented comprises a plurality of privately or publicly connected nodes, comprising one or more processor nodes, machines, or servers or clusters of servers and or nodes, that are enabled to exchange information over one or more links. Exemplary networks comprise any one or more of WANs, LANs, PANs, Internet 120, as well as ad hoc networks such as Bluetooth or Extranets. A node comprises one or more processor units (software or hardware, or virtual nodes) and/or devices located anywhere in the network that processes information and/or performs an attributed function, such as crypto analytics. Any node or any component with a node can be virtualized in hardware or software to implement an analytics engine or an agent described above. Different types of nodes can include a receiver node, which receives information, a processor node, which processes information, and a transmitter node, which transmits processed information. Examples of nodes include server nodes, client nodes, computer nodes, processor nodes, communication nodes, work stations, PDAs, mobile devices, sensors, etc.

For example, memory analytics are performed by processes on nodes or machines of the system to detect cryptographic operations and extract keys, where Ransomware Rewind software uses both user and kernel space libraries to monitor device activity. The user devices can be devices operating individually or in groups or sub-groups. The nodes of the system can be connected to each other according to any suitable network model, including but not limited to client server models as well as a hierarchical or distribution models. A link comprises any medium over which two nodes may communicate information with each other. Exemplary links include, but are not limited to, wired, fiber, cable, or wireless links (e.g., Bluetooth, UWB, USB, etc.). A communication channel comprises any channel used with a link for delivery of content, which can include data obtained from nodes, applications or agents executing in nodes or devices.

Figure 10:
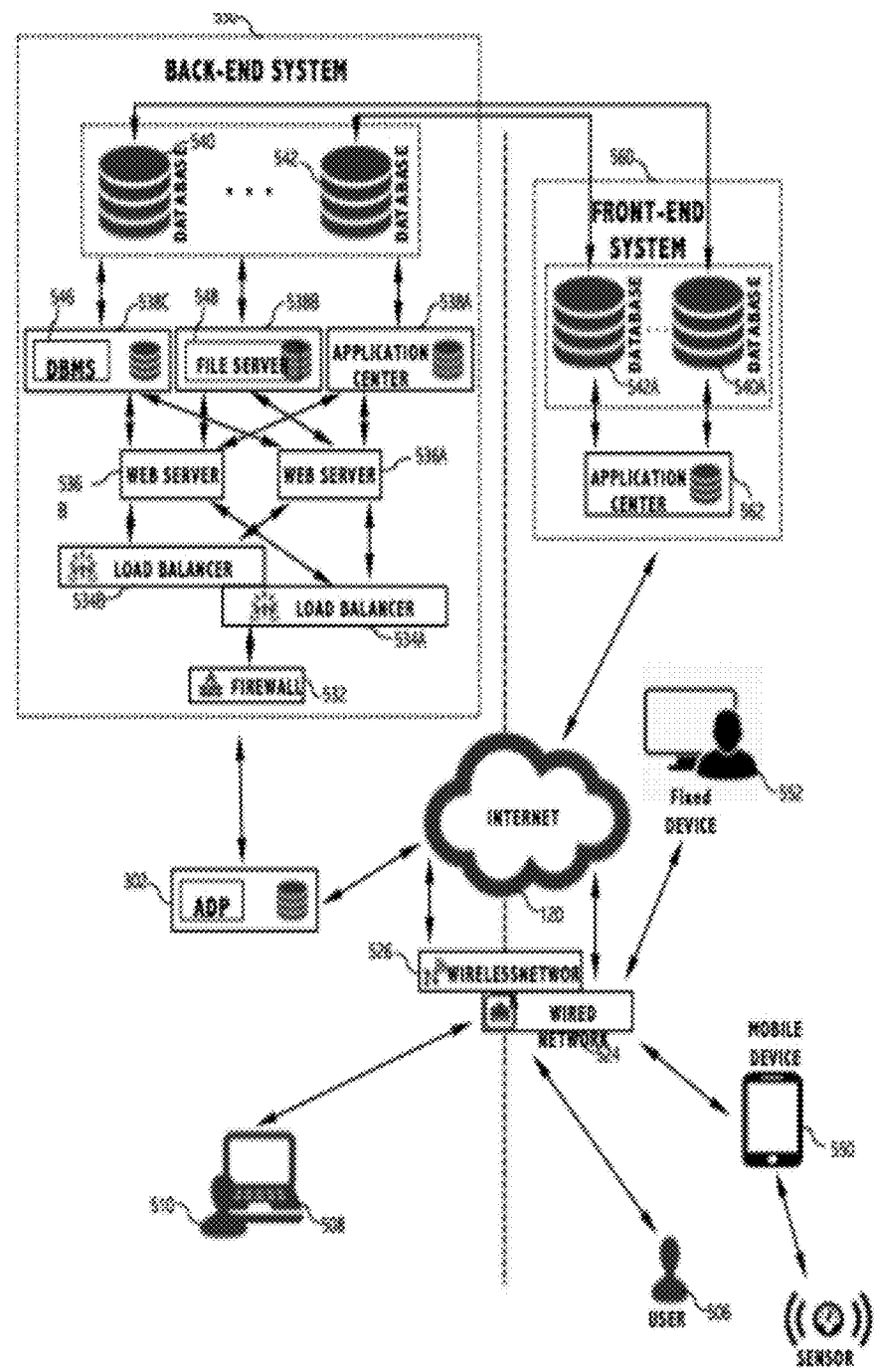
FIG. 10 shows an exemplary block diagram of operation layers of the system of FIG. 1 that implements the present invention for service subscribers in groups or sub-groups.

FIG. 10 shows an exemplary block diagram of operation layers of the system of FIG. 1 that implements the present invention for service subscribers in groups or sub-groups. According to this embodiment, the system includes a back-end system 530 and a front-end system 560. The front-end system 560 provides user interfaces to subscribed service users and participants. The back-end system 530 is used for system administration, billing, etc. The front-end system 560 allows user access to application center 562, which accesses back-end databases 542A and 540A, such as the artifacts database 22 shown in FIG. 1. The front-end system 560 provides the managers interactive access to users and user groups sessions via user devices 550 and 552. The users interface with the front-end and back-end systems 560 and 530 via the Internet 120 or through a wired network 524 and/or a wireless network 526. In an exemplary embodiment, the user devices execute a network access application, for example, but not limited to a browser or any other suitable application or applet, for accessing the back-end system 530 or the front-end 560, depending on defined access privileges which may be subject to multiple levels of administrative privileges under multiple levels of access control. The users 510, 552, or 550 may be required to go through a log-in session and multiple levels of authentication before entering the system.

In the exemplary embodiment shown in FIG. 10, the back-end system 530 includes a firewall 532, which is coupled to one or more load balancers 534A, 534B. Load balancers 534A-B are in turn coupled to one or more web servers 536A-B. The web servers 536A-B are coupled to one or more application servers 538A-C, each of which includes and/or accesses one or more databases 540, 542, which may be central or distributed databases, which store cryptographic materials and artifacts.

Web servers 536A-B, coupled with load balancers 534A-B, perform load balancing functions for providing optimum online session performance by transferring subscribers, participant, users, managers, or administrators requests to one or more of the application servers 538A-C. The application servers 538A-C may include a database management system (DBMS) 546 and/or a file server 548, which manage access to one or more databases 540, 542. In the exemplary embodiment depicted in FIG. 10, the application server 538A and/or 538B provides applications to the participants 506, 510, 552 which includes electronic interfaces, application material, participant profiles, etc.

The central or distributed database 540, 542, stores, among other things, artifact data and application material deliverable to user devices. The database 540, 542 also stores retrievable information relating to or associated with various types of participants, administrators, managers, user groups, user profiles, billing information, schedules, statistical data, progress data, user attributes, participant attributes. Any or all of the foregoing data can be processed and associated as necessary for achieving a desired objective associated with operating the system of the present invention, for example, data related to conditions, tasks, schedules, and so on.

Ransomware Rewind executed in one or more nodes that are under the control of one or more operating systems determines paths to trap files in directories and drives using multiple methods. Ransomware Rewind specifies file paths for trap files in positions using search tree algorithms such as binary search tree and tree traversal. Tree traversal is a process of visiting each node in a tree data structure. Such traversals are classified by the order in which the nodes are accessed for attack. Directories and drives are chosen and can be local to the node for use by users and program during normal operating system operations. If a node has multiple users, trap file locations include all possible users on the system, including administrative, management, and system users. Given that file systems are organized as multiple tree hierarchies inside of operating systems, the identified locations are at the highest level tree points in the file system.

After the highest level tree points are chosen for each tree, file paths to "trap files" are determined. The trap files are stored based on the file paths, which are determined to trap a ransomware attacker of the trap files. In one embodiment, the algorithm for determining trap file paths uses tree traversal algorithms, including both depth-first traversal (Pre-Order, In-Order, Reverse In-Order, and Post-order), breadth-first traversal, Monte Carlo tree search, and random sampling algorithms. The algorithms are combined with sorting methods and an automated file and directory search algorithm is used to determine order of access to trap files within those tree traversal behaviors. For example, file size, file name, file type, and date of file creation or last edit can all be used.

For example, paths to trap files across the system are determined using tree traversal and sorting/order of access algorithms. Trap file names and attribute tables are created to maximize the probability that, whichever sorting algorithm, searching/traversal algorithm, file type, or file attribute prioritization algorithm is used, there is a very high probability that a Ransomware Rewind installed trap file will not only be included in the ransomware attack, but will also be the first or one of the first trap files to be accessed for attack.

The naming of trap files, their paths, their contents, and their attributes are adjusted using a pseudo-random algorithm. This pseudo-random algorithm is designed so that all variables associated with the trap files are not able to be automatically detected and ignored by attackers, but are able to be identified by all Ransomware Rewind software regardless of which software installation created them.

The trap file artifacts are hidden from view from users, and most are in locations that a user will not access during their normal use of their programs regardless. Administrators may observe trap file artifacts during system and server maintenance activities while using privileged account access. All trap file artifacts are catalogued in the Ransomware Rewind database, and are available for identification via the Ransomware Rewind administration portal.

When a new possible device or directory is created or made available on a system with Ransomware Rewind installed, the Ransomware Rewind software automatically creates additional trap file artifacts for that drive or directory as necessary to ensure protection monitoring is in place. Ransomware Rewind software monitors file resources made available to the system during installation and during operations, whether local, or remote, and whether a drive letter or mount point is associated with an available resource.

Network resources are often more valuable to both the attacker and the victim, due to the volume of data stored in centralized business locations, but also each piece of data used by multiple personnel or programs to the business is highly likely to be more important. Monitoring network resources is performed by all clients and servers that have Ransomware Rewind installed. This is to ensure that access of a network resource, whether by an attacker infecting the network resource itself, or via a connected client accessing the network server, is monitored. Any individual client also cannot be assumed to be on or connected to a resource, so all software installations which have access to a shared resource, all monitor at the same time.

With all possible clients monitoring a shared resource at a given time, a security manager will receive an alert from all connected Ransomware Rewind software installations online at time of shared resource trap file artifact interaction. This would result in possibly thousands or greater incidents being alerted to a security manager. An algorithm is used to ensure that the minimum number of alerts are sent to the security manager, despite scenarios where multiple clients are infected and attempting to access a trap file artifact on a shared resource, if the shared resource does not have Ransomware Rewind monitoring enabled through attacker actions or another reason, or if the client which is accessing the trap file does not have Ransomware Rewind software installed.

Preferably, the alert reporting algorithm for shared network resources has low latency, to milliseconds, due to the speed by which modern ransomware encrypts files. This means that there cannot be, for example a delay waiting for a currently offline client, such as the one that installed the trap file, to reconnect to the shared resource at some point in the future or to be notified by other monitoring clients. The alert reporting algorithm functions regardless of what percentage of monitoring clients are currently monitoring local and shared trap file artifacts at any given moment.

The alert reporting algorithm must also function such that only those clients with Ransomware Rewind software installed which are actively engaging with a shared resource trap file should be alerted, for the security manager to know which nodes are infected, and to enable automated or manual response for only the infected nodes.

The alert reporting algorithm must also function such that if a client accessing the shared resource trap file does not have Ransomware Rewind software installed or enabled, an alert identifying the accessing client is included in the alert.

To ensure that monitoring of a shared resource trap file is maintained by all clients with Ransomware Rewind software, but that only the nodes which are directly accessing the trap file alert and provide option for automated or manual remediation are alerting, the algorithm uses operating system API, e.g., Windows File Access Driver API, activity which indicates interaction with shared resource or remote trap file.

To ensure monitoring of a shared resource trap file artifact which is currently being accessed by a client which does not have Ransomware Rewind software enabled, or if trap file artifacts are being installed locally from the shared resource server itself, Ransomware Rewind software is installed on the shared resource server, and alerts are generated for locally accessed trap files on the server in addition to alerts generated from clients which are accessing the shared trap file remotely. Based on the alert generated, the security manager has the ability to observe if a client without Ransomware Rewind software installed is accessing the file server. This information detailing the originating source of trap file access is gathered using operating system API call monitoring of trap file access operations on the server.

An alert is generated regardless of what percentage of shared resource clients are online at time of trap file artifact access. An algorithm is used to ensure that all Ransomware Rewind installations with clients and servers must not all alert a victim, or all react. Instead, only a node or workstation whose operating system detects an attack sends alerts. There could be, at most, 2 alerts of potential trap file activity: the shared resource device with Ransomware Rewind installed, and the client which is currently accessing the trap file on the shared network resource, if only two machines were involved.

In the case of the shared resource machine, the trap file is local to that machine. The Ransomware Rewind software on the server reports the trap file access, and which remote client is currently accessing the file trap. This is in case the remote client does not currently have Ransomware Rewind software installed or running.

In the case of the client, all of the clients are monitoring through Windows File Access Driver API which trap files are being accessed. Only the client(s) which directly access (es) the trap files issue an alert of potential ransomware activity, instead of all possible clients which can observe the access.

By combining both server monitoring, and client monitoring, alerts for only directly encrypting or encrypted affiliated clients and servers are indicated, but at least one alert is indicated, if at least one machine has Ransomware Rewind installed.

In one embodiment, steganography is used inside pseudo-randomly Generated trap files. Trap file contents cannot be identical between trap files visible to the Ransomware Rewind software, and cannot be identical between different Ransomware Rewind installations on systems. This is to provide uniqueness in case a trap file has been discovered to be stolen during a cyber attack, and to prevent the attacker from recognizing the trap file, especially automatically, and avoiding or behaving differently concerning interacting (such as encrypting) a trap file.

The trap file contents also need to be known by the Ransomware Rewind server, without needing to be passed back and forth between them. This is because the known plaintext trap file is necessary to both track tampering, even if the trap file is discovered due to customer action or attacker theft, and to demonstrate a successful decryption by Ransomware Rewind server decryption capabilities in case the trap file was encrypted.

To ensure both the Ransomware Rewind server and all software tracks the unique trap file contents, a pseudo-random trap file contents generation algorithm is used, based on an algorithm that can use a shared negotiated seed for each, that enables the file contents to be reconstructed on the Ransomware Rewind server, without needing the trap file to be transmitted prior to attacker action. This auto-generation produces legitimate files with proper contents, such as a PDF with real text and image contents, that would be properly rendered via the appropriate tool (such as Adobe PDF Reader) if viewed by that application.

Additionally added to the trap file are details of the node or client or machine, file location, and Ransomware Rewind software installation unique identifiers to trace an individual trap file back to its source in case of data theft. The details also capture environment information useful for later forensic analysis. This is encrypted and encoded into the trap file using a selection of modern steganographic techniques that are available. The particular technique and encryption key is shared between a trap file and the Ransomware Rewind database.

The present invention differentiates between legitimate trap file access and ransomware. It is always possible for legitimate file access to occur. Steps are taken to both automatically exclude non-ransomware interaction, and to allow the user to create automation exceptions or confirmations of attack based on information gathered during alert. Combinations of observations concerning interaction with file traps are used to provide a confidence score to ignore, alert, or to automatically respond. Separate observations offer lower confidence of an attack. Observations for automated response include:

- read, write, or copy access of files that are hidden, require administrative privileges to access, or are in locations not associated with normal business operations;
- altering contents of a trap file;
- alerting contents of a trap file in which the known contents dramatically increase in contents entropy. High entropy is indicative of robust encryption such as used in ransomware. Lowering entropy can be indicative of a change in file contents to prepend encrypted contents with a ransomware tracking identifier used by the attacker, which is sometimes observed in ransomware protocols.
- Alerting of file attributes including size, date accessed, date created, permissions, owning user, or filename
- Accessing program characteristics such as properly signed and operating system validated executable, program with very high permissions such as System privileges, a program that the Ransomware Rewind has observed accessing protected portions of the operating system, or a program which Ransomware Rewind observed potentially being attacked and hijacked (process hollowing, process injection) by an attacker
- A program which is attempting to access many files simultaneously Ransomware Rewind software is configurable to react automatically in a pre-determined manner, either always or per set parameters such as time of day, or to notify and prompt the user for a desired response. It also, during notification, provides the user with details on the process path, attributes, permissions, and relevant analytic details for the program which is interacting with a particular artifact, including the machine information for which machine is alerting. The Ransomware Rewind software is configurable to provide multiple responses, either automated without user interaction, or manually after a user confirms a possible ransomware activity.

In order to respond to a potential security incident which has been generated by a user's agent, the user may task the agent into taking a specific action, including a remedial action against a probability of ransom attack. Tasks contain PIDs and/or executable paths in order to know which process to take action on. Tasks can be scheduled to automatically happen on specific time frames or in response to agent environment events. These task actions are how the system decides how to handle or remedy particular processes which have been flagged as a potential ransomware attack. To remedy the potential ransomware attack, the agent can be tasked to Ignore, Isolate, Kill (Safe and Unsafe), or Suspend (Safe and Unsafe) a given process via a process identifier (PID) or executable path.

When a message is received from the service for a process to be isolated, its ID is added to an internal table only visible by the driver and a handle is acquired for that process. When an isolated process is checked during a filesystem resource handle acquisition, the driver uses its handle to the isolated process to check that the process ID that is to be isolated is the same process that should be blocked. If the isolated process is removed, its old process ID is freed from the list of isolated processes so that new processes will not be affected by the old request to isolate Security managers may observe legitimate access to Ransomware Rewind software installed trap file artifacts, such as through automated backup of all possible files on a shared resource. It may not be desired by security managers to receive alerts when certain programs access trap file artifacts on certain machines, or security managers may wish to receive alerts but not take automated responses. Alerts inform security managers of the file path and system location of the program which is currently associated with an incident. The security manager may record a one-time or permanent task to ignore the alert for either future alerts or to exempt the program from automated remediation, referred to as a one-time or a permanent white list entry. The security manager user is recorded for future auditing in the client organization.

Partially in response to whitelisting such as performed by Ransomware Rewind client security managers, attackers also attack legitimate business applications, to make trusted applications perform tasks on behalf of attackers. Multiple attacks are known and established to attackers and defenders, which add additional capability to existing running applications that are desired by the attacker. For example, this free program included source code of 4 types of adding additional capability, and taking control of existing running programs, and is available for download and customization by attackers: https://github.com/3xp101tc0d3r/ProcessInjection.

Ransomware Rewind detection and response alerts, in the case of a legitimate program that has been hijacked by an attacker, would report that known program in an incident. Ransomware Rewind monitors for program attacks such as this, and reports that to the security manager during an alert, if a program has experienced this type of attack before accessing trap file artifacts.

In the case of a security manager whitelisting a program, an alert is still recorded in the Ransomware Rewind incident database, and made available for security managers to observe at a later date, even if the program is trusted. The security managers, in that case, should use knowledge of their business to help inform their assessment also performed by Ransomware Rewind as to whether this application should have been accessing file traps artifacts at the time of the incident.

The tasks can be created from any integration application, web application or or mobile application, and the agent will configurably "check in" with the REST API periodically, e.g., once a minute, for new tasks. The agent will receive information about any pending tasks including process information and action to take. After completion of a task the agent will call out to the REST API, marking the completion of the specific task and reporting any new information gained about the suspicious process. Tasks can be manually submitted to the agent or they can be automatically scheduled. Scheduled task responses can be given time and repetition intervals. During a scheduled interval for a given user or group, any applicable non-whitelisted processes that are determined to be suspicious will be automatically handled based on the schedule. This allows for automatic action to be taken after hours, during the holidays, or whenever someone may not be able to immediately check in to their admin panel and decide to take action on a process. Tasks are sent to the REST API from the web app or mobile app as a response to a security incident. Tasks serve to inform the agent software what to do in a specific instance. Tasks can currently do the following actions, with more to follow: Isolate, Safe Suspend (Freeze), Safe Kill, Unsafe Suspend (Freeze) or Unsafe Kill. The agent will check in with the API for tasking frequently, e.g., every 1 m.

Users can create a schedule in order to automatically inform the agents associated with a selected group how to respond when a potential threat against their device(s) occurs. In creating the schedule, users pick a start and end date over a start and end time in any flexible scheduling arrangement. A repeat option gives users the ability to set this automation to repeat daily, weekly, monthly, or never. Users select a Group from one of the Groups they are a member of in order to associate this automated schedule with. Users can pick a task to associate with the schedule including options to isolate, safe suspend, safe kill, unsafe suspend, and unsafe kill processes. Users can see a grid containing all existing schedules associated with any Group the current user is a member of. The grid shows helpful information to the user about the schedule. In one embodiment, users can access the system to find out what Group the given schedule is a part of In another embodiment, users can access the chosen repeated patterns, the dates for the schedule to start and end, and the chosen task to automate for the schedule. Users also have the option to delete an automated schedule or edit the schedule. The agent will use these schedules in order to automatically decide how to respond to a suspicious process.

Figure 11:
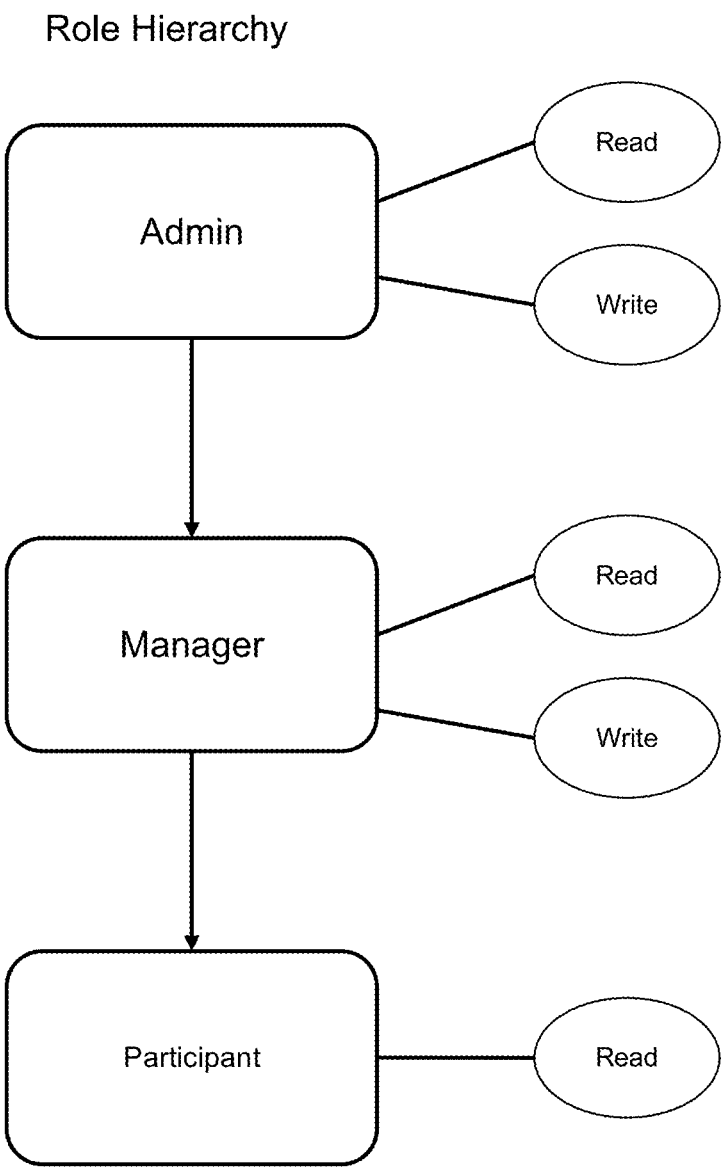
FIG. 11 shows a hierarchy of roles assigned to users called Admin, Manager and Participant where an Admin user and Manager user have read or write privileges, while a Participant user only has read privileges.

In yet another embodiment, role based security is applied across the SaaS platform. FIG. 11 shows a hierarchy of roles assigned to users called Admin, Manager and Participant where an Admin user and Manager user have read or write privileges, while a Participant user only has read privileges. Users can be assigned roles in one or more Groups for managing other users within their own Groups. A user with sufficient privilege who is a member of a Group, can identify a role for the Group by naming the role. Users with sufficient privilege can select, or access rights, that role. For example, a user can be assigned a role to be a "Group Manager", which allows the user to add and remove users from a Group and assign roles to users within that Group. In one embodiment, the system provides the option to select a "Group Manager" checkbox, which identifies all the listed permission and privileges under the Group Manager role.

Others roles assigned to a user within a Group or Subgroup could be "Response Automation Manager" or "Incident Manager". The Response Automation Manager role allows a user assigned to the role to create an automated schedule, edit a schedule, or delete a schedule. The Incident Manager role allows users to determine how they want to manage an incident, such as ignore or kill an incident. The right to perform tasking and automated response and remediation functionalities are granted to by a Group Manager.

A Group Manager can select a group and create custom roles. If permitted by Group Manager, such custom roles can be created by users who have access privileges to do so for the Group. Such users also have the ability to see each role and its association with Groups they are a member of. These roles are displayed inside a grid interface where privileged users can edit them or delete them. Once again, only users with granted permissions can edit or delete a role.

For group management, privileged users with permission can add other users to Groups they belong to. For example, a Group Manager can select which Group to add a user to if such Group Manager has permission within the selected Group to add a user to that group. Users with privileges can register another user when adding to a Group, this new user will automatically be added to the selected Group. A group management web page shows each of the Groups and their members. Users can also see what membership of other users in the same Groups they are in. Also, Group Managers have the option to remove a user from a certain Group or assign a user certain roles made for that Group. A security check is made so that not just any user can remove or assign roles within groups. Users have a map listing a Group to a list of roles associated with that Group. They can be assigned multiple roles for the same Group, and they can be assigned multiple roles across any Group that the user is a member of. If a role is deleted, it is deleted from the map of all users who have been assigned this role.

Interfering with encryption of a file, to include stopping the program being encrypted, typically results in a corrupted file. When a program, as common with modern programs to include ransomware, encrypts multiple files at the same time, all files mid-encryption are corrupted. Ransomware samples have been observed opening as many as 50 files at once to encrypt, meaning that canceling the ransomware mid-encryption would result in, in that example, 50 corrupted files.

Ransomware Rewind software automatically or through user intervention removes the permissions for a running process to access additional files to write, by adjusting the operating system security token. The operating system security token for a process is the means for an operating system to allow or disallow actions for a process. This isolation response is near instantaneous, as the operating system checks the security token of a process before performing operating system API calls, of which file access operations work inside the context of the operating system permissions.

Ransomware Rewind software suspend response against a process leverages the operating system memory and process management kernel API calls to suspend a process, which freezes all operations and memory for a process. This stops all activity that a process is conducting, but maintains the state the process was in at time of Ransomware Rewind response.

When a Ransomware Rewind software suspend occurs, novel and non-novel forensic memory and process analytics are run against the suspend process to include enumeration of all process functions, capture of the memory state, inspection of the process for behavioral indicators of malicious activity or indicators of compromise (IOCs), and execution of cryptographic behavior analytics on the memory to look for encryption behaviors and cryptovariables.

If desired, a user may resume operation of suspended process via the Ransomware Rewind software, via the same operating system suspend/unsuspend API call. This may be desired after the system and network have been safeguarded, and additional malicious behavior or analysis is desired during an incident response or forensic activity. This may also be useful in case of a legitimate process being alerted.

A user may also kill a process via the Ransomware Rewind software, either automatically or via user command. This uses operating system process execution and termination API calls.

The Ransomware Rewind software allows execution of isolate, suspend, or kill. "Safe suspend" and "safe kill" functions combine isolation, suspend or kill, and one additional piece of functionality to eliminate file corruption for files mid-encryption. Since attackers typically delete or encrypt backups before encrypting files, and since backups are typically incomplete, corrupting files unnecessarily should be avoided, to allow decryption. Ransomware Rewind software, on execution of isolation or any combination command leveraging isolation, monitors files currently being written using operating system file access APIs. After all files for that process have been completely encrypted, for scenarios for when user data encryption is not prevented, Ransomware Rewind reports status to the security manager, and continues automatically suspending or killing the program as necessary. Using isolation, and waiting for any in-progress encryption to complete as necessary, decryption of any encrypted files is possible.

Unsafe suspend or kill is possible with Ransomware Rewind software, in which neither isolation, nor waiting for existing file encryption activities to occur, are completed prior to suspending or killing a process.

The implementation of the present invention by managing web pages generate by Ransomware Rewind software system:

Manage Agents Page

This page contains a grid that lists all agents that are associated with a Group Id that the current user is a part of. The columns on the grid show information on each agent. On the grid, there is an option to change the scan speed of the agent, varying from low to extreme, and there is the option to set the agent to monitor the kernel as true or false. There is a sub grid of the agent grid that will show the path for the trap file if available. Also on this page, there is a downloader button that gives users the option to download the agent.

Manage Decryptors Page

This page allows users to see the decryptors that have been purchased for each Group the current user is a part of. The information for each decryptor is displayed on the grid for the page, and users have the option to download each decryptor as well.

Submit Encrypted File and Download Solutions page

The Submit Encrypted file page gives users the functionality to submit an encrypted file, and select an agent to decrypt this file.

Users can see the solution for this uploaded file in the Download Solutions page. There is a grid on this page that shows the solutions for the uploaded files. Users can download the encrypted file, download the decrypted sample, or download the solution for the uploaded files.

Security Incidents Page

This page allows users to see a grid for any security incidents that are associated with any Group Id the current user is a member of, which includes the status of the particular incident.

Users can see more information about the incident as well in the details of the grid. Users also have the option to assign a task for the incident, such as:

dismiss, isolate, suspend, or kill the incident. They have the option to ignore the incident as well if desired.

See more about managing incidents in the Tasking and Automated Response & Remediation sections.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

The invention claimed is:

1. A method for protecting a computing device of a target system against ransomware attacks, wherein the computing device employs a file system having a data structure used by an operating system of the computing device for accessing files based on file paths, wherein operating system uses a filing system implemented in a storage having a directory that contains a list of file names and other information related to the files, including the file paths, the method comprising the steps of:
   a. installing an agent in the computing device, wherein the agent is a software or a hardware that performs one or more actions autonomously on behalf of the target system, including specifying one or more saved file paths in the storage device to one or more trap files each having a trap file name in the directory, wherein a trap file is a file access to which indicates a probability of ransomware attack;
   b. monitoring access to the one or more trap files to detect the probability of ransomware attack;
   c. upon detecting access to a trap file, performing a remedial action against the probability of ransomware attack.

2. The method of claim 1, wherein the data structure of the file system is a tree structure.

3. The method of claim 2, wherein a file path for a trap file is specified at the highest point of the tree structure.

4. The method of claim 2, wherein the one or more file paths to the trap files are specified using a search tree algorithm.

5. The method of claim 4, wherein the search tree algorithm comprises binary search tree algorithm.

6. The method of claim 4, wherein the search tree algorithm comprises a tree traversal algorithm.

7. The method of claim 6, wherein the tree traversal algorithm is one of depth-first traversal, breadth-first traversal, Monte Carlo tree search, or random sampling algorithms.

8. The method of claim 7, wherein the depth-first traversal algorithm is one of Pre-Order, In-Order, Reverse In-Order, or Post-order algorithm.

9. The method of claim 7, wherein trap file attributes including name are set such that the trap files are encountered first during tree traversal operations.

10. The method of claim 1, wherein the remedial action includes notifying a user of the target system.

11. The method of claim 1, wherein the remedial action includes automatically uploading a trap file for analysis or decryption.

12. The method of claim 1, wherein the remedial action includes identifying a process that accesses the one or more trap files.

13. The method of claim 12, wherein the identified processes is either isolated, killed or suspended.

14. The method of claim 1, wherein the remedial action includes performing memory analytics to extract a cryptovariable.

15. The method of claim 1, wherein the probability of ransomware attack is determined based on one or more of access rate, permission level, file content or attribute changes, cryptographic activity or source process to the one or more file traps.

16. The method of claim 1, wherein the system 1s monitored for cryptovariable activity.

17. The method of claim 1, wherein potential cryptovariables are captured and stored.

18. The method of claim 1, wherein a process is monitored such as to allow in-progress file encryption to be completed, without allowing new files to be opened.

19. The method of claim 1, wherein the file paths comprise pseudorandom file paths and contents of trap files, include steganographic material.

20. The method of claim 1, wherein only those clients who directly access trap files on shared resource are alerted.

* * * * *